UNITED STATES PATENT OFFICE.

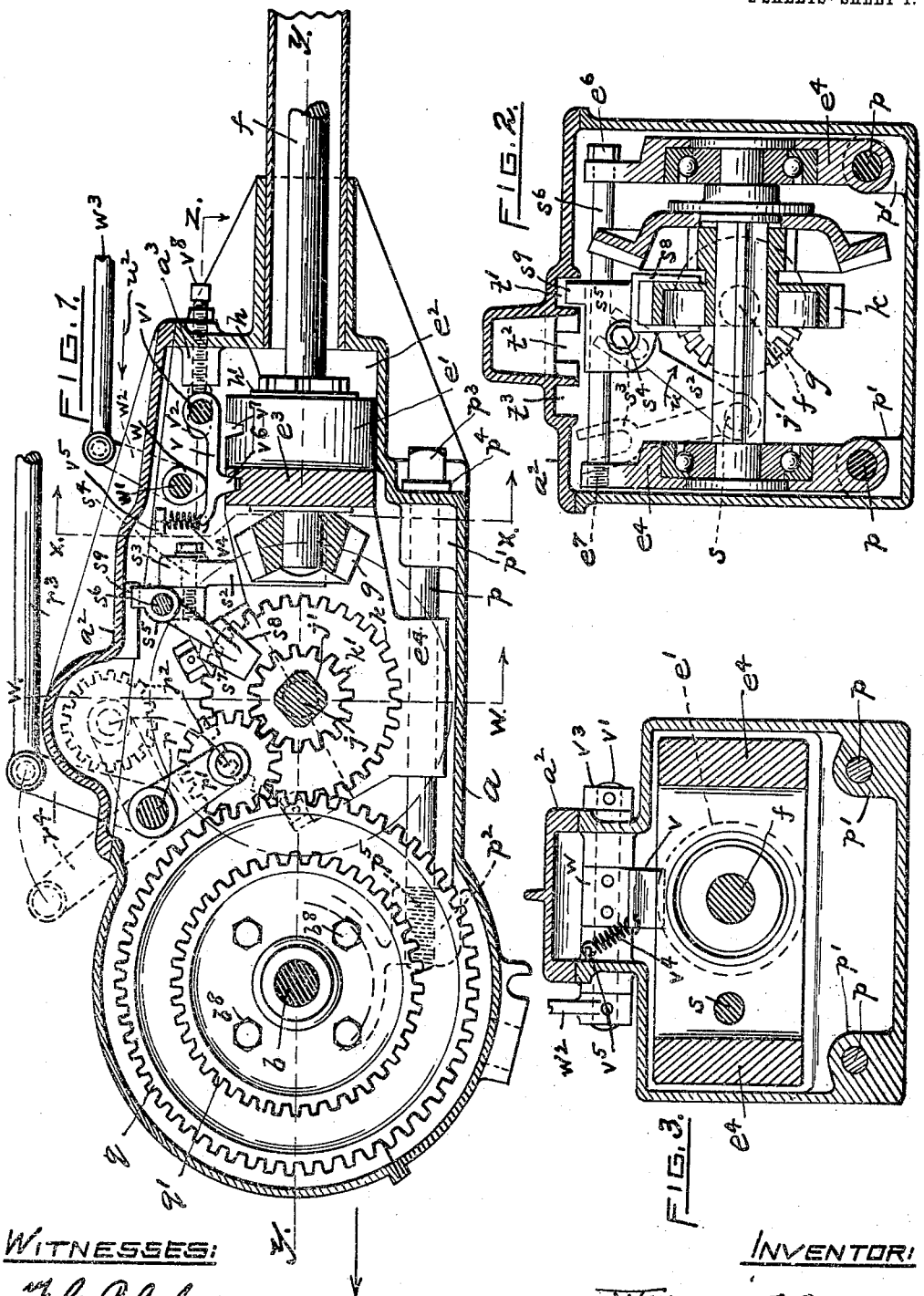

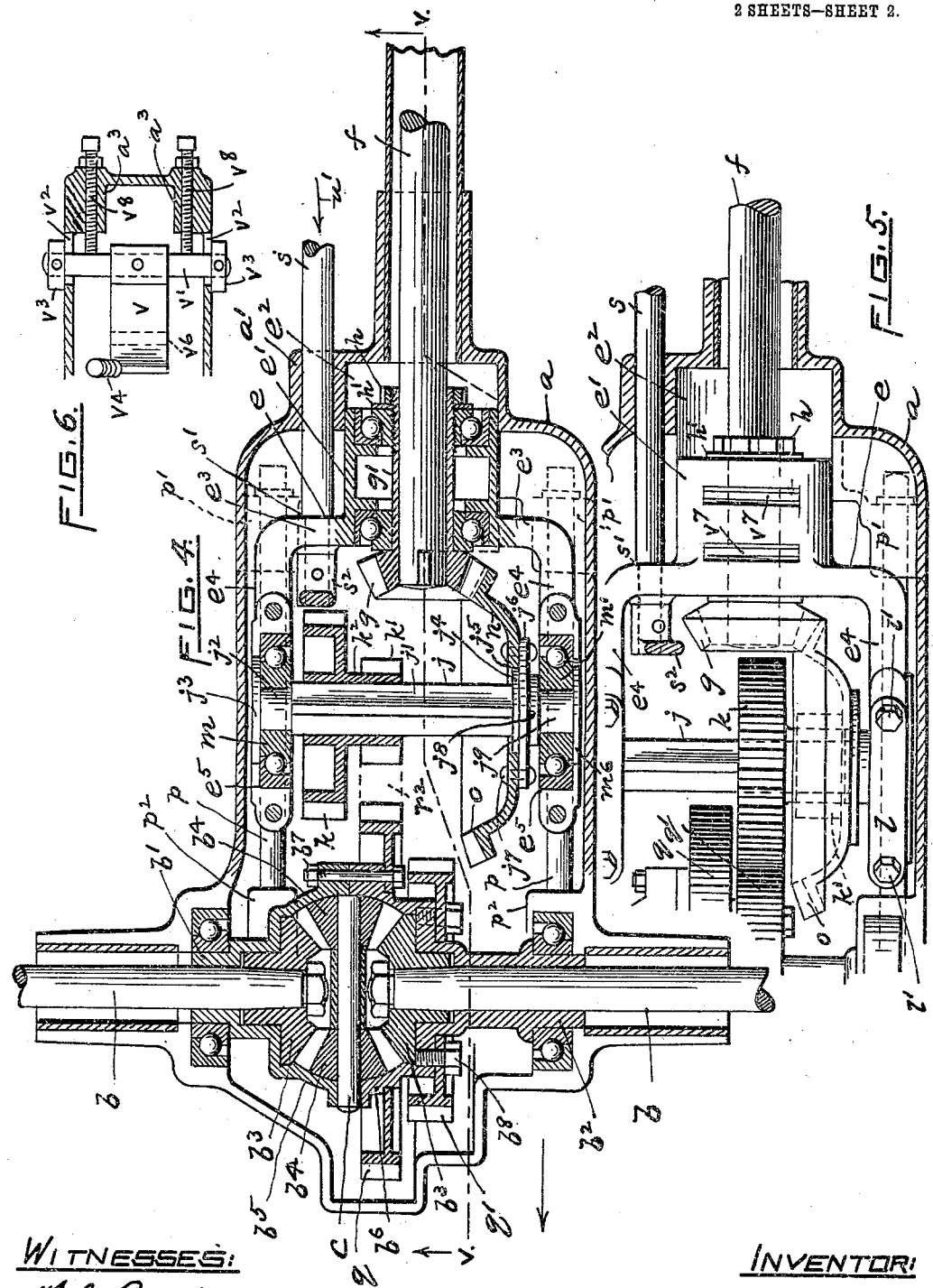

WILLIAM F. SWORD, OF PAWTUCKET, RHODE ISLAND, ASSIGNOR TO EVERETT S. CAMERON, OF BEVERLY, MASSACHUSETTS.

TRANSMISSION-GEARING.

959,900.     Specification of Letters Patent.     Patented May 31, 1910.

Application filed June 24, 1909. Serial No. 504,185.

*To all whom it may concern:*

Be it known that I, WILLIAM F. SWORD, a citizen of the United States, residing at the city of Pawtucket, in the county of Providence and State of Rhode Island, have invented certain new and useful Improvements in Transmission-Gearing, of which the following is a specification.

My invention relates to a transmission gearing essentially designed for use in connection with a motor-driven vehicle.

The prime object of the invention is to provide two slidable spur gears of different size properly mounted and actuated by suitable means to engage two fixed spur gears of different size and surrounding the stub-axles of the vehicle, to effect a change of three different speeds by the said sliding gears, and means to permit of a reverse drive.

Further objects of my invention are to provide respectively an adjustable latch to lock the slidable gears in their adjusted position; a device for shifting the slidable gears; the construction of shaft for the slidable gears, and guide rails for the frame in which said shaft is mounted, and these improvements having novel features of construction and arrangement as will render the same more efficient and certain in their operation for effecting a change of speed quickly and easily, and at the same time form structural parts that are more durable and ready of adjustment than has heretofore been the case with devices of this kind.

In the accompanying drawings, Figure 1 is a longitudinal view taken on line $v.-v.$ of Fig. 4, showing the general arrangement of parts embodying my improvements. Fig. 2 is a transverse sectional view taken on line $w.-w.$ of Fig. 1. Fig. 3 is a transverse sectional view taken on line $x.-x.$ of Fig. 1. Fig. 4 is a plan sectional view taken on line $y.-y.$ of Fig. 1. Fig. 5 is a partial view showing the relative position of the change gears, as for high speed drive. Fig. 6 is a sectional view taken on line $z$ of Fig. 1, showing the latch for locking the slidable gears in their proper position.

Like reference characters indicate like parts.

Referring to the drawings, a suitable casing $a$ is provided to inclose the transmission gearing and its operating parts, said casing having the transverse oppositely disposed stub-axles $b$, $b$ mounted in proper supports $b^1$, $b^2$ and each stub-axle provided with a bevel-gear $b^3$ meshing with bevel-pinions $b^4$, $b^4$, mounted on a case which incloses said gears $b^3$ and said pinions $b^4$, the whole forming a compensating gear of well-known construction.

A spider-frame $e$ has a cylindrical head $e^1$, which is slidable in a chamber $e^2$ formed in the opposite or front end of the casing $a$.

The engine-shaft $f$ is made fast to a bevel-gear $g$ which has an integral sleeve $g^1$ surrounding said shaft, and said gear abuts an anti-friction ball-roller cage mounted in the frame-head $e^1$ while the opposite end of the gear-sleeve $g^1$ is exteriorly screw-threaded to respectively receive a spanner-nut $h$ and washer $h^1$, to abut a similar ball-roller cage mounted in said frame-head $e^1$. From the spider frame-head $e^1$ project two oppositely arranged arms $e^3$ whose outer ends terminate with walls $e^4$, $e^4$ which extend parallel with and close to the sides of the casing $a$, and two anti-friction ball-roller cages are mounted opposite each other in the walls $e^4$, $e^4$ to receive the end portions $j^2$, $j^3$ of the transversely arranged shaft $j$ which carries the slidable change gears $k$, $k^1$. The ball-roller cages for the spider-walls $e^4$ are of cylindrical form to fit within the bores that are partially formed through said walls, as at points $e^5$, $e^5$ in Fig. 4, and each of said cages is inclosed by a cap $l$ which is secured to said walls $e^4$ by bolts $l^1$, $l^1$, as shown in Fig. 5.

The shaft $j$, which forms one of my present improvements, is constructed as follows: Referring to Fig. 4, that portion of said shaft $j$ upon which the spur gears $k$, $k^1$ slide upon, is made square-shaped in cross-section, as at $j^1$, and one end of this flattened portion is reduced to form a cylindrical shank $j^2$ which is concentric to the axis of said shaft and adapted to rest upon the journal bearing of the ball-roller cage $m$, and this shank $j^2$ terminates with an enlarged circular flange $j^3$ to abut the outer face of said cage. At the other end of the flattened portion of the shaft $j$ is an enlarged circular hub $j^4$ concentric to the axis of said shaft and adapted to fit within the bored opening $j^5$ formed through the wall $n$ of a large bevel-gear $o$, which is always in mesh with the bevel-gear $g$. Surrounding the hub $j^4$, is a flange $j^6$ which is secured by rivets $j^7$, $j^7$ to the wall of the bevel-gear $o$. Concentric to the axis of the shaft $j$ is another circular hub $j^8$ arranged to abut against the inner face of the ball-roller cage $m^1$, and from said hub $j^8$ said shaft is reduced in diameter to form another cylindrical shank $j^9$ to abut the outer face of said cage $m^1$, and concentric to said shank $j^9$ is a circular flange $m^6$ abutting said cage.

Referring to Fig. 1, the lower portion of the side walls $e^4$, of the spider-frame $e$, is each bored longitudinally therethrough to loosely receive bolts $p$, $p$, which act as guide-rails to permit a sliding movement of said spider-frame thereupon. The casing has integral hubs $p^1$, $p^2$, one pair of said hubs $p^1$ being located near the front end portion of the casing $a$ and the other pair of hubs $p^2$ near the rear end portion thereof, and each bolt $p$ is respectively provided with a head $p^3$ to receive a wrench for turning the bolt, a collar $p^4$ to abut the outer face of the casing $a$, and the opposite end portion of each bolt exteriorly screw-threaded to engage thereby in the threaded bore of each rear hub $p^2$, and this construction and arrangement of parts forming another improvement in my present invention.

Referring to Fig. 4, a case surrounds the bevel-gears $b^3$, $b^3$ and $b^4$, $b^4$, and said case is made in halves $b^5$, $b^6$ which are secured together by bolts $b^7$. The support $b^1$, for the stub-axle $b$, is integral with the case-half $b^5$ and the support $b^2$ is integral with the case-half $b^6$, and on the latter case-half are secured a large ring spur gear $q$ by bolts, as $b^7$, and a smaller ring spur gear $q^1$ by bolts $b^8$. The slidable gear $k$, which is smaller in diameter than the last said gear $q^1$, and the slidable pinion $k^1$ are both integral with a long hub $k^2$ having a square opening to loosely fit upon the shaft $j$. The slidable gear $k$ is adapted to mesh with the large spur gear $q$ when desired to obtain an intermediate speed forward, and, as seen in Fig. 5, said gear $k$ is also adapted to mesh with the spur gear $q^1$ when desired to obtain a high speed forward, and to obtain a low speed forward the pinion $k^1$ is adapted to mesh with the said large spur $q$.

Referring to Fig. 1, to obtain a reverse transmission drive the casing $a$ has a transverse shaft $r$ on the inner end of which is made fast an arm $r^1$, which carries a pinion $r^2$ adapted to mesh with the large spur gear $q$ and pinion $k^1$, said pinion $r^2$ being swung to engagement with said gears $q$ and $k^1$ by means of an operating-rod connection $r^3$ with an arm $r^4$ made fast on the outer end of said shaft $r$.

Referring to Fig. 4, the means to effect the aforesaid changes of speed is as follows: At the front of the casing $a$ is an integral hub $a^1$ which is bored to receive an operating-shaft $s$ which has its inner portion reduced in diameter in order to pass through an arm $e^3$ of the spider-frame $e$ and leave a shoulder to abut the outer face of said arm, as at $s^1$, and on the inner end of the reduced portion of said shaft $s$ is made fast a lever $s^2$ whose upper portion is forked-shape, as at $s^3$ in Figs. 1 and 2, for connection with a bolt $s^4$ made fast in a block $s^5$ which is slidable on a transversely arranged bolt $s^6$ whose ends are mounted in the upper portion of the side walls $e^4$, $e^4$ of the spider-frame $e$, one end of said bolt having an integral head $e^6$ to abut one wall $e^4$ and the other end of said bolt screw-threaded to engage a threaded opening formed in the opposite wall $e^4$, as at $e^7$. The block $s^5$ has an integral arm $s^7$ depending therefrom and which arm terminates with a yoke or saddle $s^8$ designed to straddle the peripheral portion of the slidable gear $k$, and at the upper part of said block $s^5$ is an integral lug $s^9$ adapted to enter three entering-passages $t^1$, $t^2$, $t^3$ formed in the casing-cover $a^2$. Thus, when—say a high speed is required on the part of the operator he first turns the shaft $s$ in the direction indicated by the arrow $u$ in Fig. 2, after which he forces said shaft backward in the direction indicated by the arrow $u^1$ in Fig. 4, until the lug $s^9$, of the block $s^5$, has entered the entering-passage $t^1$ of the casing-cover $a^2$, when the slidable gear $k$ will then be in mesh with the stub-axle gear $q^1$, in the manner shown in Figs. 1 and 2. When intermediate speed is required the shaft is operated upon in the same manner as above described to bring the lug $s^9$ within the entering-passage $t^2$, when the slidable gear $k$ will then be in mesh with the large stub-axle gear $q$. When a low speed is required the shaft $s$ is operated upon in the manner as above described to bring the lug $s^9$ within the entering-passage $t^3$, and thereby cause the pinion $k^1$ to mesh with the large stub-axle gear $q$, and at the same time this movement permits of a reverse transmission to be had by means of the pull-rod connection $r^3$ to cause the intermediate pinion $r^2$ to swing to engagement with said pinion $k^1$ and said spur gear $q$, in the manner shown in Fig. 1, and this shipping means forms a further improvement in my present invention.

My final improvement consists in means to hold the slidable gears $k$ and $k^1$ in their proper adjusted position, and this construction of parts is as follows: Referring to Fig.

1, $v$ is a latch which has one end made fast on a rod $v^1$, which is mounted transversely of the casing $a$, and the ends of said rod project through elongated slotted openings $v^2$, $v^2$ formed in the sides of said casing, said rod being prevented from displacement by means of collars $v^3$, $v^3$ made fast on the ends of said rod, and the opposite end of this latch has a pull-spring connection $v^4$ with a tongue $v^5$ integral with said casing. Said latch $v$ has a downward extending lug $v^6$ to fit within either of two grooves $v^7$, $v^7$ formed transversely in the upper portion of the spider-head $e^1$, so that by this construction the latch locks the slidable gears $k$ and $k^1$ in either of their three forward speed positions as described.

To permit the teeth of the slidable gears $k$ and $k^1$ to mesh uniformly with the teeth of the stub-axle gears $q$ and $q^1$ two screw-threaded bolts $v^8$, $v^8$ pass through threaded openings formed in integral hubs $a^3$, $a^3$ of the casing $a$, in order that the ends of said bolts may come in contact with and force said rod toward the stub-axles and thereby obtain the requisite degree of adjustment to mesh said gears, in the manner shown in Fig. 6.

To hold the latch $v$ in a locked position, as shown in Fig. 1, a cam $w$ is made fast on a shaft $w^1$, secured in the casing $a$, and which shaft has an arm connection $w^2$ with an operating-rod $w^3$, so that a pull upon said rod, in the direction indicated by the arrow $w^2$, will cause the cam to come in firm contact and thus hold said latch in place. It is therefore evident that by means of two slidable gears to engage the two stub-axle gears I am enabled to obtain three variable speeds, and at the same time the improved construction and arrangement of parts described lessen the cost in the manufacture of the transmission gearing device.

Having described my invention, what I claim and desire to secure by Letters-Patent, is—

1. In a speed-changing device of the character described, the combination with the casing; a two-part case mounted therein; a large ring spur gear fast on said case; a ring spur gear fast on said case and of lesser diameter than the first mentioned gear; a driving-shaft; a bevel-gear keyed on said shaft; stub-axles journaled in said case and a compensating gearing thereon; a spider-frame having a head embracing said shaft and integral walls projecting from said head; bolts secured in the casing and slidable in the walls of said frame; a flat-sided shaft journaled in said frame; a second bevel-gear keyed on the last mentioned shaft and in mesh with the first mentioned bevel-gear; two integral spur gears of different size and slidable on the last mentioned shaft; means to move the frame and carry said integral gears so that the smaller one may engage the large ring spur gear to effect a low speed transmission, and the larger one of said integral gears to engage said large ring spur gear to effect an intermediate speed transmission and to engage the small ring spur gear to effect a high speed transmission.

2. In a speed-changing device of the character described, the combination with the casing; a two-part case mounted therein; stub-axles journaled in said case and compensating gearing thereon; the ring spur gears $q$, $q^1$ carried by said case; a driving-shaft; a bevel-gear fast on said shaft; the guide-rails $p$, $p$ mounted in said casing; a spider-frame slidably mounted on said rails and having a head embracing said shaft and said head provided with grooves; the shaft $j$ journaled in said frame; the two gears $k$, $k^1$ on the last mentioned shaft; means to cause the last mentioned gears to slide on the last mentioned shaft; a bevel-gear on the last mentioned shaft and in mesh with the first mentioned bevel-gear; the latch $v$ to engage in either groove of the frame-head; the bolts $v^8$ to permit of adjustment of said latch; the cam $w$, and means to cause said cam to contact upon and hold said latch in position.

3. In a speed-changing device of the character described, the combination with the casing; a two-part case mounted therein; stub-axles journaled in said case and a compensating gearing thereon; two different size ring spur gears carried by said case; a driving-shaft; a bevel-gear fast on said shaft; guide-rails mounted in the casing; a spider-frame slidable on said rails and having a head embracing said shaft; a flat-sided shaft mounted on said frame; a second bevel-gear fast on the last mentioned shaft and in mesh with the first mentioned bevel-gear; two different size integral spur gears on said flat-sided shaft; means to cause the last mentioned gears to slide on the last mentioned shaft whereby the smaller integral gear may engage with the large ring spur gear, and the larger integral gear to engage either of said ring spur gears; a pinion; and means to swing said pinion into engagement with the large ring spur gear and the smaller one of the integral gears.

4. In a speed-changing device, the combination of the casing $a$; the cover $a^2$ provided with entering-passages $t^1$, $t^2$, $t^3$; the rails $p$, $p$; the frame $e$ slidably mounted on said rails and having a head $e^1$ provided with grooves $v^7$, $v^7$; the driving-shaft $f$ embraced by said frame-head; a bevel-gear fast on said shaft; the flat-sided shaft $j$ carried by said frame; the gears $k$, $k^1$; the ring gears $q$, $q^1$; means to move said frame and also slide either of said gears $k$, $k^1$ into mesh with either of said gears $q$, $q^1$; a bevel-gear fast on said flat-sided shaft and in mesh with the first mentioned bevel-gear; the gear $r^2$; means to carry the said gear into engagement with said gears $k^1$, $q$, the latch $v$ having a lug to enter in either groove in said frame-head; the pull-spring connection $v^4$ to said latch; means to adjust said latch whereby the teeth of said gears $k$, $k^1$ and gears $q$, $q^1$ are caused to mesh uniformly, and means to hold said latch in a locked position.

In testimony whereof I affix my signature in presence of two witnesses.

WILLIAM F. SWORD.

Witnesses:
C. T. HANNIGAN,
PETER C. CANNON.